US006904047B2

(12) United States Patent
Han et al.

(10) Patent No.: US 6,904,047 B2
(45) Date of Patent: Jun. 7, 2005

(54) CELL SCHEDULING METHOD OF INPUT AND OUTPUT BUFFERED SWITCH USING SIMPLE ITERATIVE MATCHING ALGORITHM

(75) Inventors: Man-Soo Han, Cheollanam-do (KR); Jung-Hee Lee, Taejon (KR); In-Tack Han, Taejon (KR); Bhum-Cheol Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 771 days.

(21) Appl. No.: 09/860,273

(22) Filed: May 17, 2001

(65) Prior Publication Data

US 2001/0043606 A1 Nov. 22, 2001

(30) Foreign Application Priority Data

May 19, 2000 (KR) ........................................ 2000-27081

(51) Int. Cl.[7] ............................................. H04L 12/56
(52) U.S. Cl. ..................... 370/414; 370/380; 370/395.4
(58) Field of Search ................................ 370/235, 380, 370/386, 387, 395.1, 395.4, 412, 413, 414

(56) References Cited

U.S. PATENT DOCUMENTS

| | | | | |
|---|---|---|---|---|
| 5,299,190 A | | 3/1994 | LaMaire et al. ........... 370/58.2 |
| 5,500,858 A | | 3/1996 | McKeown ................... 370/60 |
| 5,517,495 A | * | 5/1996 | Lund et al. ................. 370/399 |
| 6,477,169 B1 | * | 11/2002 | Angle et al. ........... 370/395.42 |
| 6,570,873 B1 | * | 5/2003 | Isoyama et al. ............ 370/375 |
| 6,633,568 B1 | * | 10/2003 | Han et al. ................. 370/395.4 |
| 6,667,984 B1 | * | 12/2003 | Chao et al. ................. 370/414 |
| 6,747,971 B1 | * | 6/2004 | Hughes et al. .............. 370/387 |
| 2002/0176431 A1 | * | 11/2002 | Golla et al. ................. 370/412 |
| 2003/0031193 A1 | * | 2/2003 | Andrews et al. ............ 370/412 |

* cited by examiner

Primary Examiner—Ricky Ngo
Assistant Examiner—Rhonda Murphy
(74) Attorney, Agent, or Firm—Seed IP Law Group PLLC

(57) ABSTRACT

A method for scheduling an input and output buffered ATM or packet switch and, more particularly, to a method for cell-scheduling an input and output buffered switch that is adapted to a high-speed large switch is provided. The input and output buffered switch has multiple switching planes, and its structure is used to compensated for decreasing performance of the input buffered switch resulting from HOL (head-of-line) blocking of the input buffered switch. The input and output buffered switch consists of input buffer modules grouping several input ports and output ports and output buffer modules, and each input buffer module has several FIFO queues for the associated module output buffer modules. In the input and output buffered switch having multiple switching planes, cell scheduling is carried out using a simple iterative matching (SIM) method. The SIM method consists of three operations, those are, request operation, grant operation, and accepting operation, and in the SIM method, the operations are iteratively carried out several times in one cell period, thereby matching efficiency can be increased. Each input buffered module determines simultaneously multiple FIFO queues served in one cell period, so that the SIM method with multiple selection ability has higher speed operations and better performance than conventional scheduling methods.

6 Claims, 11 Drawing Sheets

FIG. 2

OUTPUT BUFFER MODULE

|  | 1 | 2 | 3 | 4 |
|---|---|---|---|---|
| 1 | 1 | 1 | 1 | 0 |
| 2 | 1 | 0 | 0 | 1 |
| 3 | 0 | 0 | 1 | 1 |
| 4 | 1 | 1 | 0 | 1 |

INPUT BUFFER MODULE

|   | 1 | 2 | 3 | 4 | ~22 |
|---|---|---|---|---|---|
| 1 | 1 | 1 | 1 | 0 | |
| 2 | 1 | 0 | 0 | 1 | ~21 |
| 3 | 0 | 0 | 1 | 1 | |
| 4 | 1 | 1 | 0 | 1 | |

TRANSMISSION REQUEST (left, ~23)
INFORMATION OF HOL CELLS (right)

$a(\lambda,1)$

FIG. 3B

|   | 4 | 1 | 2 | 3 | ~25 |
|---|---|---|---|---|---|
| 4 | 1 | 1 | 1 | 0 | |
| 1 | 1 | 0 | 0 | 1 | ~24 |
| 2 | 0 | 0 | 1 | 1 | |
| 3 | 1 | 1 | 0 | 1 | |

TRANSMISSION REQUEST (left, ~26)

FIG. 3C

| | 1 | 2 | 3 | 4 | — 28 |
|---|---|---|---|---|---|
| 1 | (1) | 1 | 1 | 0 | |
| 2 | 1 | 0 | 0 | 1 | — 27 |
| 3 | 0 | 0 | (1) | 1 | |
| 4 | 1 | (1) | 0 | (1) | |

TRANSMISSION GRANT — 29

FIG. 3D

| | 4 | 1 | 2 | 3 | — 31 |
|---|---|---|---|---|---|
| 4 | 1 | (1) | 1 | 0 | |
| 1 | 1 | 0 | 0 | 1 | — 30 |
| 2 | 0 | 0 | (1) | (1) | |
| 3 | (1) | 1 | 0 | 1 | |

TRANSMISSION GRANT — 32

FIG. 3E

|  | 1 | 2 | 3 | 4 | ← 34 |
|---|---|---|---|---|---|
| 1 | (1) | 1 | 1 | 0 | |
| 2 | 1 | 0 | 0 | 1 | ← 33 |
| 3 | 0 | 0 | (1) | 1 | |
| 4 | 1 | (1) | 0 | (1) | |

TRANSMISSION ACCEPT — 35

FIG. 3F

|  | 4 | 1 | 2 | 3 | ← 37 |
|---|---|---|---|---|---|
| 4 | 1 | (1) | 1 | 0 | |
| 1 | 1 | 0 | 0 | 1 | ← 36 |
| 2 | 0 | 0 | (1) | (1) | |
| 3 | (1) | 1 | 0 | 1 | |

TRANSMISSION ACCEPT — 38

FIG. 4A

| | 1 | 2 | 3 | 4 | ← 41 |
|---|---|---|---|---|---|
| 1 | 0 | 0 | 0 | 0 | |
| 2 | 1 | 0 | 0 | 1 | ← 40 |
| 3 | 0 | 0 | 0 | 0 | |
| 4 | 0 | 0 | 0 | 0 | |

| | 4 | 1 | 2 | 3 | ← 44 |
|---|---|---|---|---|---|
| 4 | 0 | 0 | 0 | 0 | |
| 1 | 1 | 0 | 0 | 1 | ← 43 |
| 2 | 0 | 0 | 0 | 1 | |
| 3 | 0 | 0 | 0 | 0 | |

|   | 1 | 2 | 3 | 4 | ← 47 |
|---|---|---|---|---|---|
| 1 | 0 | 0 | 0 | 0 | |
| 2 | 1 | 0 | 0 | 1 | ← 46 |
| 3 | 0 | 0 | 0 | 0 | |
| 4 | 0 | 0 | 0 | 0 | |

|   | 4 | 1 | 2 | 3 | ← 50 |
|---|---|---|---|---|---|
| 4 | 0 | 0 | 0 | 0 | |
| 1 | 1 | 0 | 0 | (1) | ← 49 |
| 2 | 0 | 0 | 0 | 0 | |
| 3 | 0 | 0 | 0 | 0 | |

| | 1 | 2 | 3 | 4 | |
|---|---|---|---|---|---|
| | | | | | 56 |

| | | | | | |
|---|---|---|---|---|---|
| 1 | 0 | 0 | 0 | 0 | |
| 2 | 1 | 0 | 0 | 1 | 55 |
| 3 | 0 | 0 | 0 | 0 | |
| 4 | 0 | 0 | 0 | 0 | |

| | 4 | 1 | 2 | 3 | |
|---|---|---|---|---|---|
| | | | | | 59 |

| | | | | | |
|---|---|---|---|---|---|
| 4 | 0 | 0 | 0 | 0 | |
| 1 | 1 | 0 | 0 | (1) | 58 |
| 2 | 0 | 0 | 0 | 0 | |
| 3 | 0 | 0 | 0 | 0 | |

60

CELL SCHEDULING METHOD OF INPUT AND OUTPUT BUFFERED SWITCH USING SIMPLE ITERATIVE MATCHING ALGORITHM

TECHNICAL FIELD

The present invention generally relates to a cell scheduling method of input and output buffered ATM or packet switch, and more specifically, to a cell scheduling method using an input and output buffered switch architecture with multiple switching planes, thereby making large capacity switching and increasing switch performance and to a cell scheduling method using simple iterative matching algorithm, thereby making high-speed operation and being easily implemented with hardware.

BACKGROUND OF THE INVENTION

Input buffered asynchronous transfer mode (ATM) or packet switch has worse switch performance than an output buffered switch since Head-Of-Line (HOL) blocking occurs in the input buffered ATM or packet switch. One of techniques that mitigate HOL blocking is a virtual output queuing (VOQ) of which each input port maintains a buffer for each output port. In VOQ, there are N input ports and each input port has N queues to the corresponding output ports. And then, in VOQ, there are $N^2$ input queues in total. Transfer has to be made for just N queues among the $N^2$ queues. Therefore, contention occurs among the input queues in VOQ. The well-known methods for achieving contention control include PIM (Parallel Iterative Matching), iSLIP, and 2DRR (Two-Dimensional Round-Robin) schemes.

PIM consists of 3 phases; request, grant and accept phases. In the request phase, each of $N^2$ queues sends request to output ports. In the grant phase, each of the output ports grants one request among its own receiving requests using a random selection and notifies the result of grant to each of the input ports. An input port may receive several grants from each output port at the same time so that in the accept phase each of input port accepts one grant among its own receiving grants using a random selection. And several request-grant-accept phases are iteratively performed. In the PIM, although the performance of the PIM is enhanced with several request-grant-accept phases being iteratively made, it is difficult to achieve high-speed operation because of using random selection in the grant and accept phases.

The iSLIP has an architecture that discards the operation of the random selection of PIM and is described in U.S. Pat. No. 5,500,858, which is granted on Mar. 16, 1996, to N. McKeown, entitled "Method and apparatus for scheduling cells in an input queued switch" and the disclosure of which is incorporated herein by reference. The iSLIP uses a round-robin operation instead of a random selection in the grant and accept phases of the PIM. That is, in the iSLIP, one request among several requests and one grant among several grants are selected using round-robin pointers without using any random selection. However, in the iSLIP algorithm, as the number of input ports and output ports increases, the number of requests and accepts which must be searched in the grant and accept phases within one unit time also increases. As the result, it is difficult to achieve high-speed operation as the number of input ports and output ports in the iSLIP increase.

2DRR algorithm is described in U.S. Pat. No. 5,299,190, which granted on Mar. 29, 1994 to R. O. LaMaire et al., entitled "Two-dimensional round-robin scheduling mechanism for switches with multiple input queues", the disclosure of which is incorporated herein by reference. In the 2DRR algorithm, request is determined with searching a request matrix in just N steps, which is a two-dimensional N×N matrix representing $N^2$ requests. In the U.S. Pat. No. 5,299,190, "basic 2DRR algorithm" searches request matrix in accordance with a searching sequence defined in a pattern sequence matrix and determines request to be transmitted. And "enhanced 2DRR algorithm" makes improvement of "fairness property" for specific traffic pattern.

In the above mentioned 2DRR algorithm, if the number of input ports and output ports is large, a large number of search steps are needed to perform the 2DRR algorithm so that high-speed operation is not easily made.

Meanwhile, if the number of input ports and output ports increases, the number of FIFO queues existing in one input buffer module also increases. The number of input buffer modules increases as well. And then during the contention control, required amount of information is increasing so that the hardware implementation is difficult to be achieved.

To solve the above drawbacks of hardware implementation and at the same time to improve switch performance, there is an enhanced architecture, that is, input and output buffered architecture. In the input and output buffered switch, input ports and output ports are grouped by several of input ports and output ports to reduce the number of input buffer modules and the number of FIFO queues in each input buffer modules so that hardware implementation is easily achieved. However, since, in the input and output buffered architecture, a large number of FIFO queues in each input buffer module are served at the same time, a large number of switching planes necessarily exist. In the above-mentioned PIM, iSLIP, and 2DRR algorithms, selection of multiple FIFO queues in one input buffer module is not available and then these algorithms are not applicable to the input and output buffered architecture.

Meanwhile, 2DRRMS as a cell scheduling algorithm for the input and output buffered architecture is described in M. S. Han et al, entitled "Fast scheduling algorithm for input and output buffered ATM switch with multiple switching planes" (Electronics Letters, Vol.35, No.23, pp.1999–2000, November 1999). 2DRRMS uses request matrix and searches pattern matrix. In 2DRRMS, request matrix is searched in accordance with a sequence as defined in search pattern matrix and a request to be transmitted is determined. In the 2DRRMS method, assume that the size of group of input ports and output ports is k, and then m(=N/k) search steps are needed. According to the 2DRRMS method, operation speed k times higher than 2DRR algorithm which requires N search step may be achieved. However, in the case that N is relatively larger than k, a high-speed operation is not easily achieved.

SUMMARY OF THE INVENTION

In order to solve the above-mentioned problems in the conventional techniques in the art, an object of the present invention is to provide a cell scheduling method as a contention control type cell scheduling method to make high speed operation to be applicable to large capacity input and output buffered switch, to select multiple FIFO queues in one input module using multiple selection type simple iterative matching, which makes high speed operation with the small number of iterations.

In order to achieve the above object of the present invention, an aspect of the present invention is to provide a cell scheduling method of input and output buffered switch using simple iterative matching, the method comprising: a request step, wherein when a unmatched FIFO queue Q(i, j) has HOL cell, each of unmatched input round-robin pointers A(i, h) sending a request signal to output round-robin pointers G(j, h); and a grant step, wherein when a unmatched output round-robin pointer G(j, h) receives said request signal, said unmatched output round-robin pointer G(j, h) searching said request signal from g(j, h)-th element of said request signal and selecting nearest request, granting, and sending a grant signal notifying whether or not it is granted to each of input round-robin pointers A(i, h); and an accept step, wherein when an unmatched input round-robin pointer A(i, h) receives said grant signal, searching from a(i, h)-th element of said grants, and selecting nearest grant. In the i-th input buffer module, n input round-robin pointers IRP A(i, h) are allocated. IRP A(i, h) is associated with the h-th switching plane, where i=1, ..., m and h=1, ..., n. And the j-th output buffer module, n output round-robin pointers ORPs G(j, h) are allocated. ORP G(j, h) is associated with the h-th switching plane, where j=1, ..., m and h=1, ..., n. a(i, h) is an element that represents one of IRPs A(i, h) that firstly attempts matching operation during a matching operation, where i=1, ..., m and h=1, ..., n. g(j, h) is an element that represents one of ORPs G(j, h) that firstly attempts matching operation during a matching operation, where j=1, ..., m and h=1, ..., n. The m is a number of the input and output buffered modules and n is a total number of switching planes.

Another aspect of the present invention is to provide a cell scheduling method for simple iterative matching operation in several times in one cell time.

The foregoing and other objects, aspects and advantages will be better understood from the following detailed description of a preferred embodiment of the present invention with reference to the drawings.

BRIEF DESCRIPTION OF THE DRAWINGS

FIG. 2 is an example of request.

FIGS. 3A–3F are a schematic diagram illustrating a first iterative operation in a method of cell-scheduling input and output buffered switch using simple iterative matching (SIM) according to the present invention.

FIGS. 4A–4F are a schematic diagram illustrating a second iterative operation in a method of cell-scheduling input and output buffered switch using simple iterative matching according to the present invention.

DETAILED DESCRIPTION OF THE INVENTION

Figure 1:
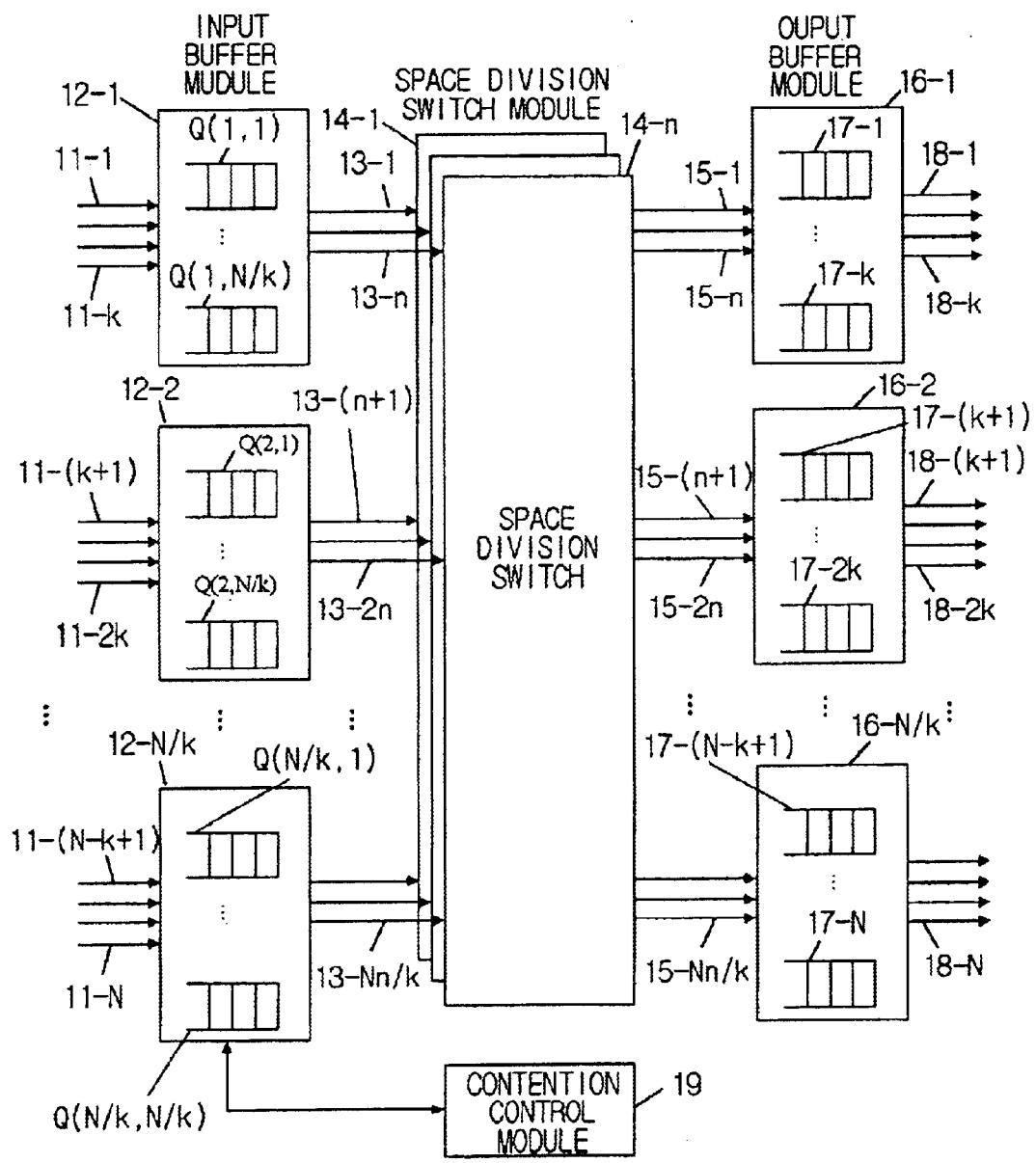
FIG. 1 is a schematic diagram illustrating the structure of input and output buffered switch having multiple switching planes applied by cell scheduling method according to the present invention.

The preferred embodiment of the present invention is described referring to the drawings.

FIG. 1 illustrates N×N input buffered switch in accordance with the present invention.

Generally, the architecture of the switch is similar to the architecture described in M. S. Han et al, "Fast scheduling algorithm for input and output buffered ATM switch with multiple switching planes" (Electronics Letters, Vol.35, No.23, pp.1999–2000, November 1999). The architecture with grouping input ports makes the total number of input buffered modules reduced and the number of FIFO queues to be considered during contention control decreased, so that it can be applied to high-speed and large capacity switching.

Firstly, the configuration and operation of the input and output buffered switch of the present invention is schematically described.

The input and output buffered switch includes m (=N/k) input buffer modules of k×n input buffer modules 12-1~12-N/k, n space-division switch modules of m×m space-division switch modules 14-1~14-n having n switching planes, m output buffer modules of n×k output buffer modules 16-1~16-N/k, and contention control module 19.

The number of input ports 11-1~11-N is N, and the input ports are grouped by k to be connected to the corresponding input buffer modules 12-1~12-N/k. In each input buffer module 12-i, i=1, ..., m, m FIFO queues Q(i, j), j=1, ..., m exist. The cells that are transmitted from input ports are routed to one of the m FIFO queues of the corresponding destination output port. Cells are served in the FIFO queue Q(i, j), and have output ports as a destination belonged to output buffer module 16-j. For example, the input ports 11-1 to 11-k are connected to input buffer module 12-1. In the input buffer module 12-1, m FIFO queues Q(1,1)~Q(1, N/k) are provided. FIFO queues Q(1,2) receive cells which have output port 18-(k+1) to 18-2k belonged to output buffer module 16-2 as destinations.

A contention control module 19 is provided to receive a binary information from each of input buffer modules 12-1~12-N/k, in which the binary information (0 or 1) represents whether a cell is or not in the HOL position of each of FIFO queues in each of input buffer modules 12-1~12-N/k. And then, a FIFO queue and a switching plane allocated to the FIFO queue with SIM method is determined using the binary information to transmit cells to space-division switch modules 14-1~14-n. And, the results of determination are to be notified to each of input buffer modules 12-1~12-N/k. Using the transmitted results, each of the input buffer modules 12-1~12-N/k transmits HOL cell of the FIFO queue for which transmission is granted to a switching plane allocated to the corresponding FIFO queue. In the moment, maximum of n cells can be transmitted to the space-division switch modules 14-1~14-n, in each of input buffered modules 12-1~12N/k.

A space-division switch is m×m non-blocking switch and is composed of n switching planes. The switch includes input links 13-1~13-Nn/k and output links 15-1~15-Nn/k. Each of cells is routed from input links 13-1~13-Nn/k to output links 15-1~15-Nn/k, using only a cell destination information. Output links 15-1~15-Nn/k of the switch are grouped by n, and connected to each of output buffer modules 16-1~16-N/k. The cell in each of the switch output links 15-1~15-Nn/k is routed to one queue among FIFO queues in accordance with its own destination output ports in the output buffer modules 16-1~16-N/k. In each of output buffer modules 16-1~16-N/k, k FIFO queues exist. And the FIFO queue is connected to each of output ports. When a cell exists in a queue, one cell of HOL position is transmitted to the output port. For example, in the output buffered module 16-1, there are k FIFO queues 17-1~17-k, and k output ports 18-1~18-k are connected thereto, so that FIFO queues 17-i are connected to output ports 18-i, where i=1, . . . , k. Therefore, in every cell time, if a cell exists in the HOL position of FIFO queue, the cell is transmitted to the corresponding output port 18-i.

Now, cell scheduling method in accordance with the present invention using simple iterative matching (SIM) which can be applied to the above mentioned input and output buffered switch is described.

In every cell period, each input buffer module (12-1~12-N/k) transmits a binary information which represents whether a cell is or not in the HOL position of each of FIFO queues in each of input buffer modules 12-1~12-N/k to a contention control module 19. The contention control module 19 performs scheduling for the binary information in accordance with SIM method and notifies a matched FIFO queue and a switching plane to be used by the FIFO queue to each input buffer module 12-1~12-N/k. The SIM method makes use of input-robin pointers (IRP) and output round-robin pointer (ORP). Now the input-robin pointers (IRP) and the output round-robin pointers (ORP) are described.

In an i-th input buffer module, n IRPs A(i, h) are allocated. An IRP A(i, h) is associated with the h-th switching plane, where h=1, . . . , n. And the j-th output buffer module, n ORPs G(j, h) are allocated. An ORP G(j, h) is associated with a h-th switching plane. The SIM method is a method for matching IRP to ORP. IRP A(i, h) can be matched to one of ORPs G(j, h), j=1, . . . , m. When IRP A(i, h) is matched to G(j, h), it is referred to "Q(i, j) is matched" and during cell transmission the h-th switching plane can be used. IRP A(i, h) uses a(i, h), which is an element that represents one of ORPs G(j, h), j=1, . . . , m to which IRP A(i, h) firstly attempts matching operation during a matching operation. If the element is p, that is, a(i, h)=p, then IRP A(i, h) attempts matching operation in accordance with a sequence of G(p, h), G(p+1, h), . . . , G(m, h), G(1, h), . . . , and G(p−1,h). The element a(i, h) is referred to a pointer value of IRP A(i, h) and denotes the priority element of IRP A(i, h). Similarly, ORP G(j, h) uses en element g(i, h) that represents one of IRPs A(j, h), j=1, . . . , m to which ORP G(i, h) firstly attempts matching operation during a matching operation. If the element g(i, h)=p, ORP G(i, h) attempts matching operation in accordance with a sequence of A(p, h), A(p+1, h), . . . , A(m, h), A(1, h), . . . , and A(p−1,h). The element g(i, h) is referred to a pointer value of ORP G(i, h) and denotes the priority element of ORP G(i, h).

And now the SIM method is described. At the beginning of each cell time, all IRPs and ORPs are not matched. In the SIM method, 3 phases of request, grant and accept phase are used and the 3 phases are processed in parallel in each IRP and each ORP at the same time.

1. Request Phase:

In the request phase, each of the unmatched IRPs A(i, h) sends a corresponding request signal to ORPs G(j, h) when an unmatched FIFO queue Q(i, j) has HOL cell.

2. Grant phase:

In the grant phase, when an unmatched ORP G(j, h) receives requests, the ORP G(j, h) searches the requests from g(j, h)-th element among the requests and selects the nearest one of the requests. And then the ORP G(j, h) provide "grant" to the nearest one of the requests. The ORP G(j, h) notifies the grant to each of IRPs A(i, h), i=1, . . . , m.

3. Accept Phase:

In the accept phase, when an unmatched IRP A(i, h) receives grant signals, the IRP A(j, h) searches the grant signals from a(j, h)-th element among the grants and selects the nearest one of the grants. In the SIM method, the 3 phases are iterated in several times in one cell time so that matching efficiency can be increased.

Also, in the SIM method, each of pointer values a(i, h) and g(j, h) is varied in a variety of manners at the beginning of every cell period so that fairness property of matching operation can be enhanced. For example, pointer value a(i, 1) is incremented or decremented by 1 and pointer value g(j, 1) is incremented or decremented by 1 at the beginning of every cell period so that fairness property of matching operation can be enhanced. In this manner, the real values of the pointer values a(i, 1) and g(j, 1) are calculated by module m where if the pointer value is equal to or less than 0, m is added, and if the pointer value is equal to or greater than m+1, m is subtracted. The combinations of the pointer values a(i, h) and g(j, h) are available as follows:

1. a(i, 1)←a(i, 1)−1, g(j, 1)←g(j, 1)−1
2. a(i, 1)←a(i, 1)−1, g(j, 1)←g(j, 1)+1
3. a(i, 1)←a(i, 1)+1, g(j, 1)←g(j, 1)−1
   a(i, 1)←a(i, 1)+1, g(j, 1)←g(j, 1)+1

Note that there is a problem that if the pointer values of some IRPs are equal such as a(1,1)=a(2,1)=, . . . , =a(m,1), the increment and the decrement of the pointer values do not have an effect to improve the fairness property. In order to solve the problem, the initial values a(i, 1), i=1, . . . , m, that is a value in the first cell time must be different values one another. Similarly, g(j, 1), j=1, . . . , m, that is value in the first cell time must be different values one another. For example, when i=1, . . . , m, and j=1, . . . , m, the initial value of each pointer value can be defined as follows:

1. a(i, 1)=i, g(j, 1)=j,
2. a(i, 1)=m−i+1, g(j, 1)=m−j+1

In the case that the initial values of pointer values are defined in a manner that one IRP pointer initial value is identical to one ORP pointer initial value, fairness property for matching operation is substantially enhanced. For example, the initial value is defined as a(i, 1)=g(j, 1)=j, i=j, HOL cell of each FIFO queue can be served at least one in m cell times.

In order to enhance matching efficiency in the SIM method, a(i,d), d=1, . . . , n, must have different values and also g(i, d), d=1, . . . , n, must have different values one another at the beginning of every cell period a(i, d).

For example, in d=2, . . . , and n, each of IRP pointer values and each of ORP pointer value can have different value, as follows:

1. a(i, d)=a(i, 1)+d−1, g(j, d)=g(j, 1)+d−1
2. a(i, d)=a(i, 1)−d+1, g(j, d)=g(j, 1)−d+1

The real values of the pointer values are calculated by module m.

Figures 4A, 4B:
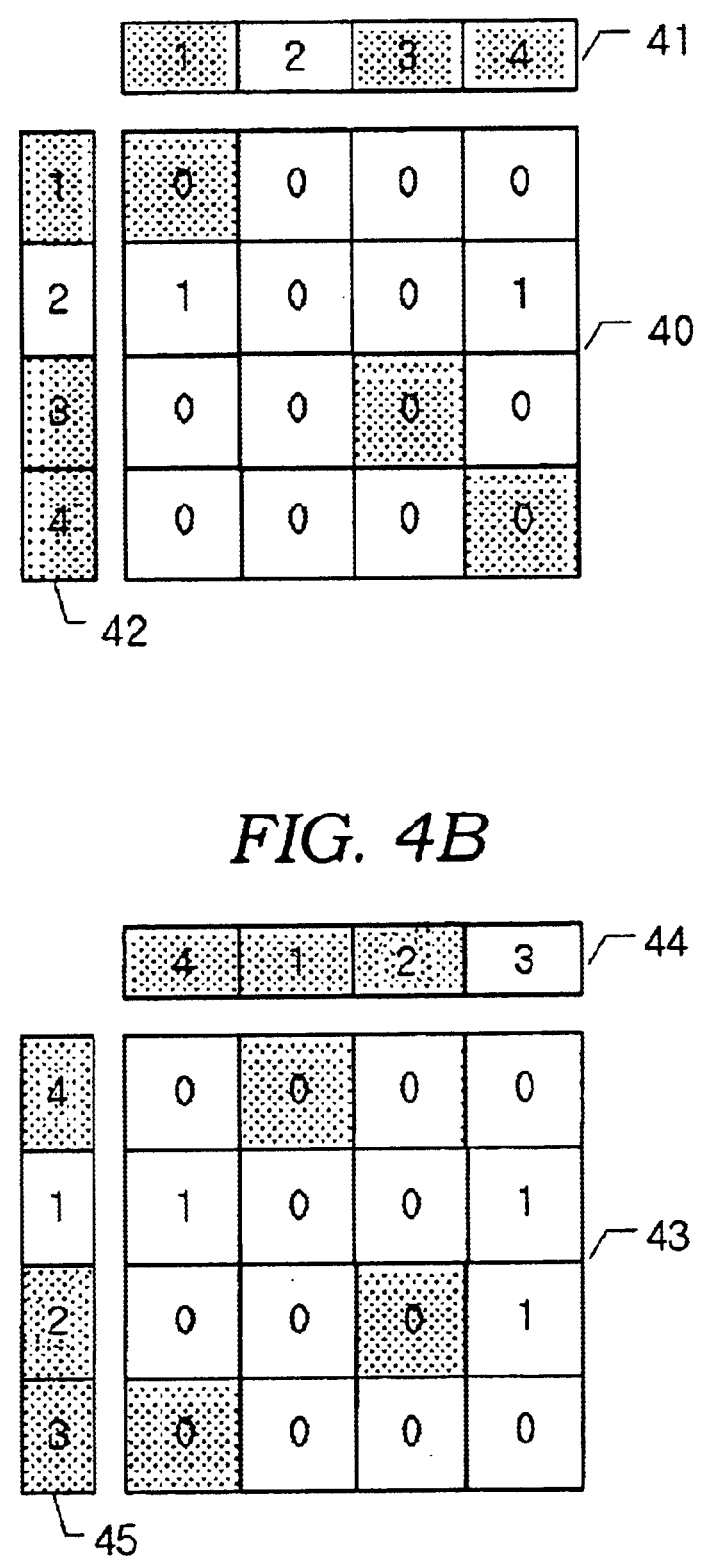
Figures 4C, 4D:
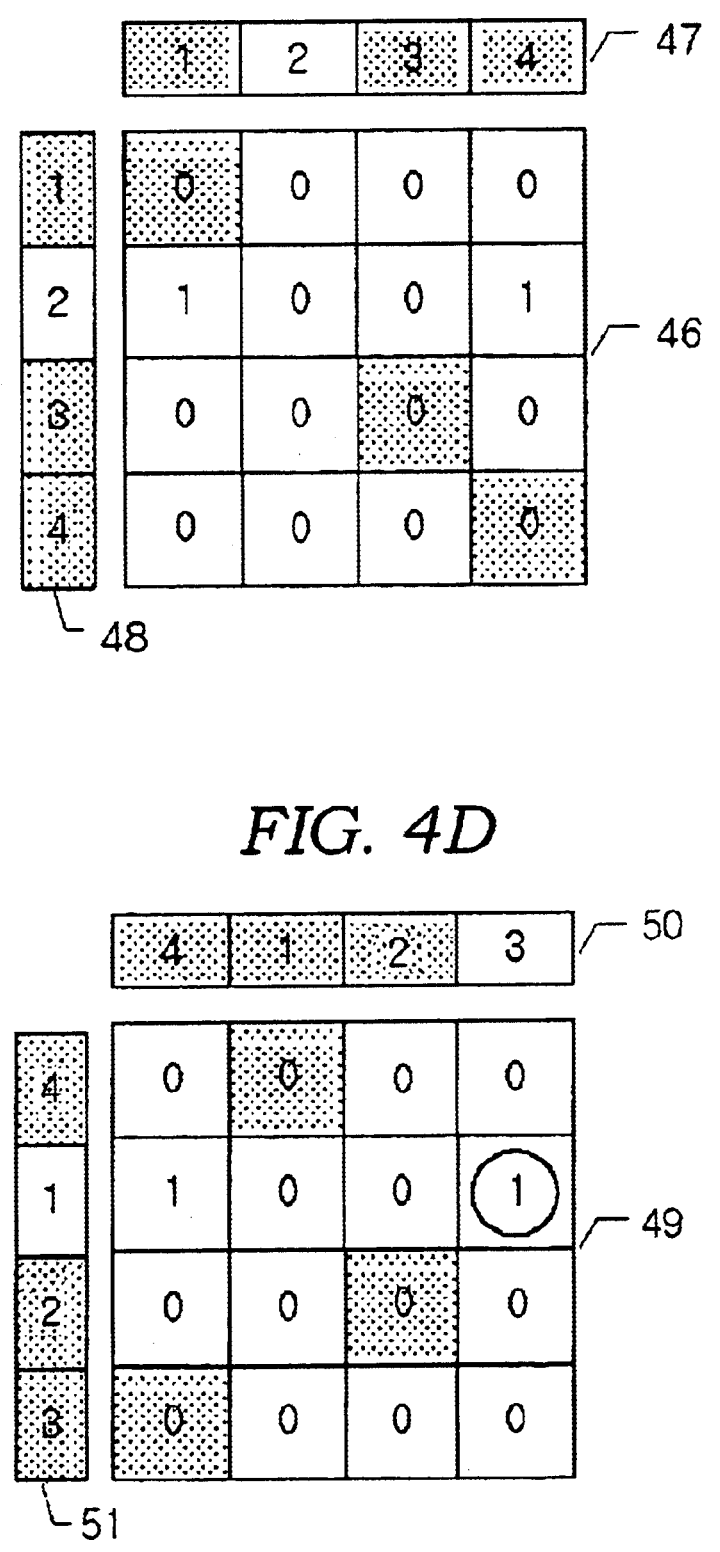
Figures 4E, 4F:
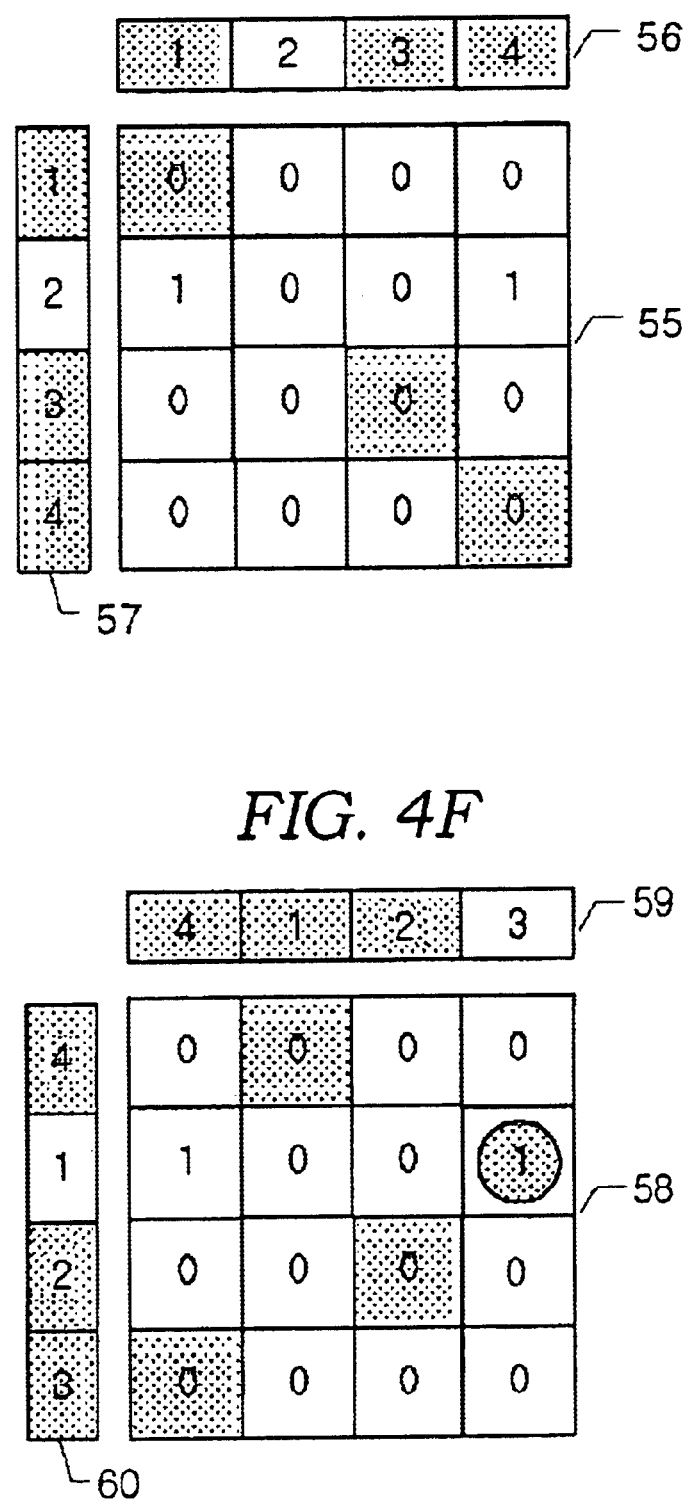

A preferred embodiment of the cell scheduling method using SIM in accordance with the present invention is described referring to FIG. 2 to FIG. 4. The embodiment is the case that m=4 and n=2, that is the number of switching plane is 2.

FIG. 2 illustrates an example of request. 20 is a HOL cell information matrix representing an information of HOL cell Q(i, j). If Q(i, j)=1, there is a HOL cell. And if Q(i, j)=0, there is not a HOL cell. The binary information in the HOL cell information matrix 20 is transmitted to a contention control module 19. In the contention control module 19, the transmitted binary information is used and cell is scheduled with SIM method using the transmitted binary information and the result is notified to each of input buffered modules 12-1~12-N/k.

FIG. 3 illustrates the first iterative operation of the SIM method.

In FIG. 3, (a) and (b) are request phases for switching plane 1 and 2, respectively, (c) and (d) are grant phases for switching plane 1 and 2, respectively, and (e) and (f) are accept phases for switching plane 1 and 2, respectively.

In the first iterative operation of SIM, requests 21 and 24 for each switching plane are the same as 20 in FIG. 2. That is, the requests 21 and 24 are matrices representing information of HOL cells. 22 represents g(j, 1), where g(j, 1)=j, j=1, ..., m. 23 represents a(i, 1), where a(i, 1)=i, i=1, ..., m. g(j, 1), j=1, ..., m, have different values, and also a(i, 1), i=1, ..., m have different values. 25 represents g(j, 2) and 26 represents a(i, 2). g(j, 2) and a(i, 2) are calculated as follows:

g(j, 2)=g(j, 1)−1, and a(i,2)=a(i, 1)−1

And then real values are calculated by module 4.

In the grant phase, ORP G(j, 1) searches from g(j, 1) position of the j-th column of matrix 27 and selects the nearest request. Similarly, ORP G(j, 2) searches from g(j, 2) position of the j-th column of 30 and selects the nearest request. In matrices 27 and matrix 30 of FIG. 3, circles in boxes represent granted requests.

In the accept phase, IRP A(j, 1) searches from a(i, 1) position of the i-th column of matrix 33 and selects the nearest grant. Similarly, IRP A(j, 2) searches from a(i, 2) position of the j-th column of matrix 36 and selects the nearest grant. In matrices 33 and 36 of FIG. 3, gray circles in boxes represent accepted grants.

FIG. 4 illustrates the second iterative operation of SIM. In FIG. 4, (a) and (b) are request phases for switching plane 1 and 2, respectively, (c) and (d) are grant phases for switching plane 1 and 2, respectively, and (e) and (f) are accept phases for switching plane 1 and 2, respectively. IRP and ORP matched in the first iterative operation, and the associated FIFO queues are represented with gray boxes. As shown in boxes 40 and 43, matched IRPs send no request. The grant and accept phases of the second iterative operation are similar to those of the first iterative operation. However, the second iterative operation is different from the first iterative operation in that the only unmatched IRPs and ORPs attempt matching operation. In the second iterative operation, there are not any additional grant and accept for switching plane 1. For switching plane 2 in the second iterative operation, A(2, 2) and G(4,2) are matched and then Q(2,4) is accepted, as shown in (d) and (f) FIG. 4.

The pointer value a(i, 1) is incremented or decremented by 1 and the pointer value g(j, 1) is incremented or decremented by 1 at the beginning of every cell period so that fairness property of matching operation can be enhanced. In this manner, the real values of the pointer values a(i, 1) and g(j, 1) are calculated by modulo m where m is added if the pointer value is equal to or less than 0, and m is substituted if the pointer value is equal to or greater than m+1.

At the beginning of subsequent cell period, g(j, 1) and a(i, 1) are incremented or decremented by 1 and the real values are calculated by module 4. For example, g(j, 1) is incremented by 1 and a(i, 1) is or decremented by 1. And then, g(j, 1)=j+1, and a(i, 1)=i−1. And also, g(j, 2) and a(j, 2) are calculated so that g(j, 2)=g(j, 1, and a(i, 2)=a(i, 1)−1 at the beginning of subsequent cell period and the real values are calculated by module 4.

Performance of SIM in accordance with the preferred embodiment of the present invention is calculated with computer simulation.

In the computer simulation, method for updating the pointer value of SIM is described. Firstly, the initial value of each of pointers are g(j, 1)=j, j=1, ..., m and a(i, 1)=i, i=1, And, at the beginning of each cell period, the updating operation is made such as g(j, 1)←g(j, 1)+1, a(i, 1)←a(i, 1)−1 and the real values are calculated by module m. And, at the beginning of each cell period, the updating operation is made such as g(j, d)=g(j, 1)−d+1 and a(i, d) =a(i, 1)−d+1 and then the real values are calculated by module m where d=2, ..., n.

Figure 5:
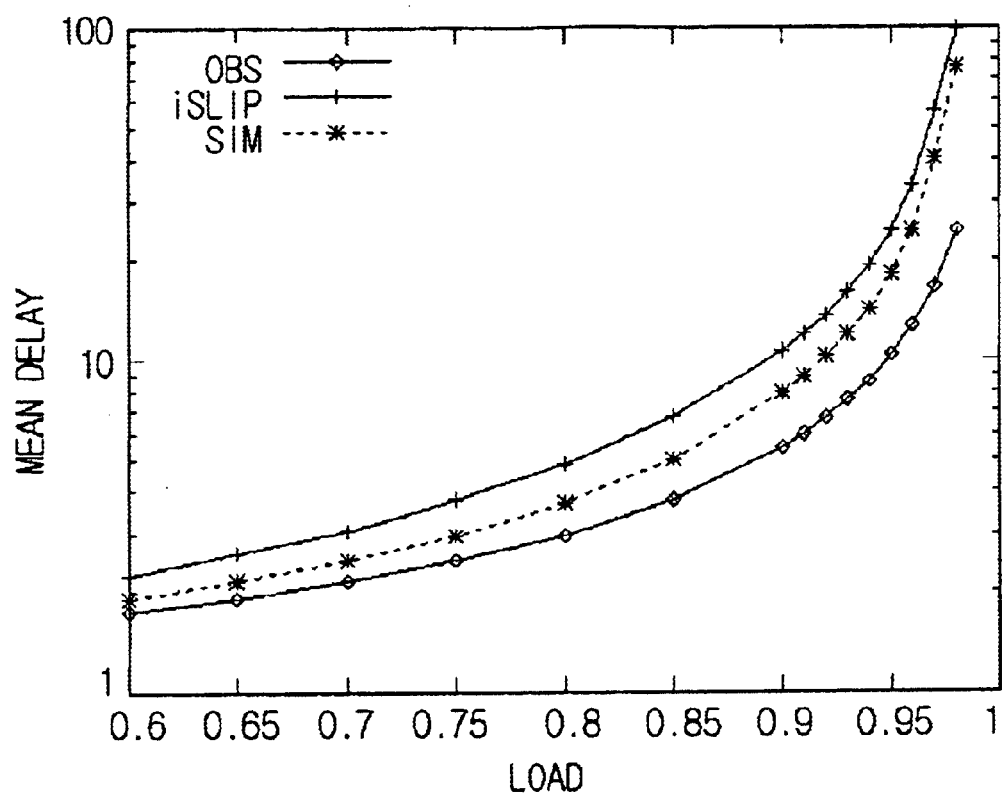
FIG. 5 is a graph illustrating performance of cell delay mean of simple iterative matching according to the present invention.
Figure 6:
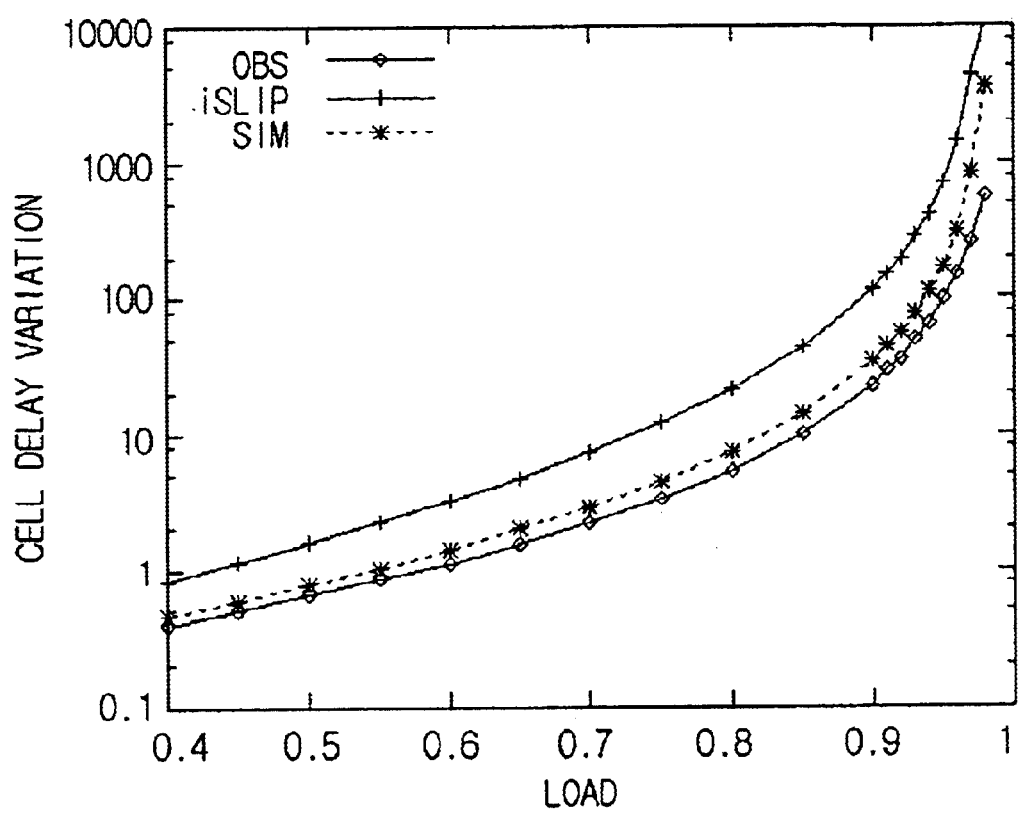
FIG. 6 is a graph illustrating performance of cell delay variation of simple iterative matching according to the present invention.

FIG. 5 and FIG. 6 are graphs illustrating comparison of performances among output buffered switch (OBS), iSLIP, and SIM methods in 64×64 switch. FIG. 5 is graph illustrating cell delay mean values of these methods, and FIG. 6 is graph illustrating cell delay variation values of these methods. The traffic model used in the performance comparison is Bernoulli arrival process. In the process, destination of each cell is evenly distributed with respect to output ports of each cell. The simulations of cell mean delay and cell delay variation are made as the input load of the traffic is increased. The simulation is performed during 100,000 cell times. In iSLIP, the iSLIP algorithm is iterated 4 times in one cell time. In SIM, the size of group is 4 that is, k=4, and then m 16. And in SIM, the number of switching plane is 2, that is, n=2. SIM methods are iterated 4 times in one cell time for the comparison to iSLIP. As shown in FIG. 5 and 6, SIM has better performance than iSLIP .

Figure 7:
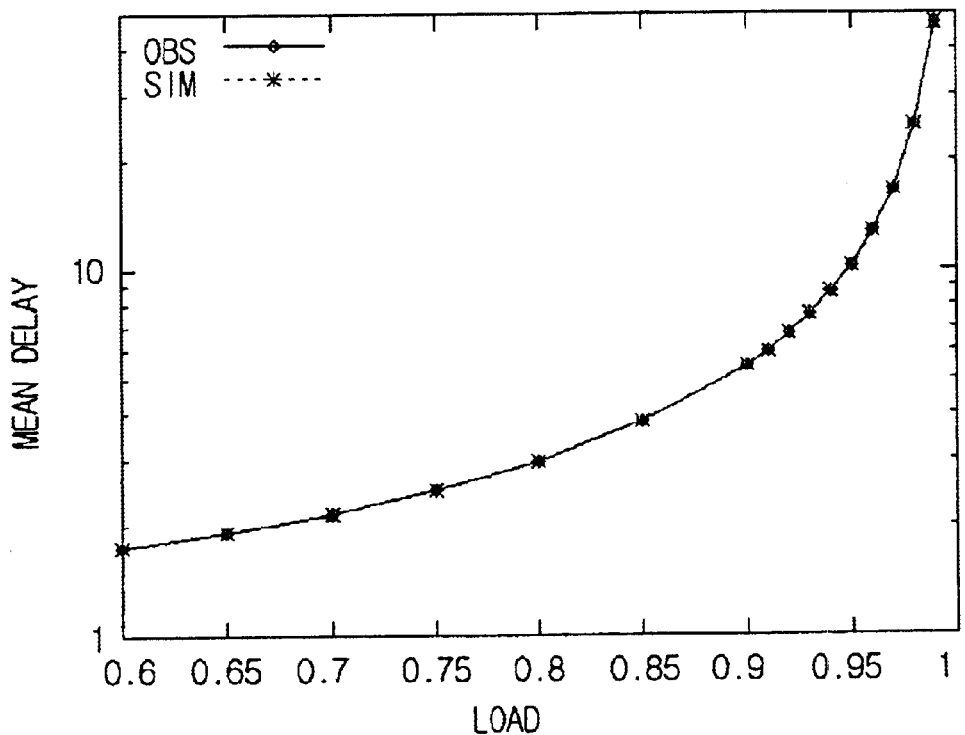
FIG. 7 is a graph illustrating performance of cell delay mean of simple iterative matching according to the present invention.
Figure 8:
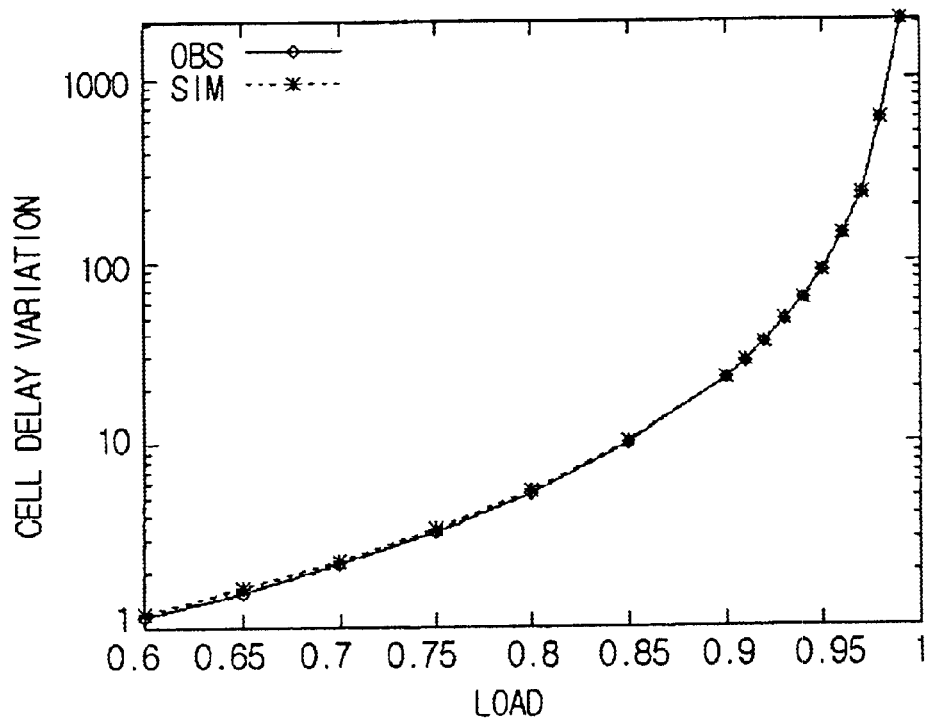
FIG. 8 is a graph illustrating performance of cell delay variation of simple iterative matching according to the present invention.

FIG. 7 and FIG. 8 are graphs illustrating comparison of performances among output buffered switch (OBS), iSLIP, and SIM methods in 64×64 switch. FIG. 7 is graph illustrating cell mean delay values of these methods, and FIG. 7 is graph illustrating cell delay variation values of these methods. The traffic model used in the performance comparison is Bernoulli arrival process, and destination of each cell is evenly distributed with respect to output ports of each cell. The simulations of cell mean delay and cell delay variation are made increasing the input load of the traffic. The simulations are performed during 100,000 cell times. In iSLIP, the iSLIP algorithm is iterated 4 times in one cell time. In SIM, the size of group is 1, that is, k=1. And in SIM, the number of switching plane is 2, that is, n=2. SIM methods are iterated 2 times in one cell time. As shown in FIG. 7 and 8, the performance of SIM applied to input buffered switch is as good as that of output buffered switch.

The cell scheduling method using simple iterative matching in accordance with the present invention having multiple selection ability makes higher speed operation and has better performance than the conventional scheduling methods.

And, the cell scheduling method using simple iterative matching in accordance with the present invention incorporated with architecture for grouping input ports and output ports can make a process in large capacity switching.

Moreover, the cell scheduling method using simple iterative matching in accordance with the present invention using multiple small capacity switching planes and having large capacity process can be easily implemented.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What we claim:

1. A method for cell scheduling in an input and output buffered ATM switch having input ports and output ports and using simple iterative matching, the method comprising:

a request step, wherein when one of unmatched FIFO queues Q(i, j) has an HOL cell, each of unmatched input round-robin pointers A(i, h) sends a request signal to output round-robin pointers G(j, h);

a grant step, wherein when a unmatched output round-robin pointer G(j, h) receives said request signal, said unmatched output round-robin pointer G(j, h) searches said request signal from g(j, h)-th element of said request signal and selects the nearest request, grants the request and notifies the grant of the request to each of input round-robin pointers A(i, h); and an accept step, wherein when the unmatched input round-robin pointer A(i, h) receives said grant signal, said unmatched input round-robin pointer A(i,h), searches from a(i, h)-th element of said grants, and selects the nearest grant to accept transmission, and when more than two input round-robin pointers among A(i,h) having the lowest h value, said unmatched input round-robin pointer A(i,h) accepts transmission with respect to the FIFO queue, wherein said input round-robin pointer A(i, h) is allocated to an i-th input buffered module and is assigned to the h-th switching plane, said output round-robin pointer G(j, h) is allocated to a j-th output buffered module and is assigned to the h-th switching plane, a(i, h) is an element for which said input round-robin pointer A(i, h) first attempts matching and g(j, h) is an element for which output round-robin pointer G(j, h) first attempts matching, and wherein i=1, . . . , m, j=1, . . . , m, h=1, . . . , n, and m is a number of input and output buffered modules, and n is a total number of switching planes.

2. The method according to claim 1, wherein in said grant step, pointer value g(j, 1) is increased or decreased by 1, and in said accept step, said pointer value g(j, 1) is increased or decreased by 1 at the beginning of each cell period, wherein real values of said a(i, 1) and said g(j, 1) are respectively calculated by module m, if said real value is equal to or less than 0, said real value is added by m, if said real value is equal to or greater than m+1, it is subtracted by m, thereby increasing fairness property of matching operation.

3. The method according to claim 1, wherein initial values of said input round-robin pointer values a(i, 1) are defined as different values, and initial values of said output round-robin pointer values g(j, 1) are also defined as different values, thereby further increasing fairness property of matching operation.

4. The method according to claim 1, wherein when defining said initial value of each of said input round-robin pointer values a(i, 1) and said output round-robin pointer values g(j, 1), which are the values for the first cell period, the initial value of one of said input round-robin pointer is defined as equal to the initial value of a corresponding output round-robin pointer, thereby further increasing fairness property of matching operation.

5. The method according to claim 1, wherein at the beginning of each cell period, each of a(i, d) has different values, and each of g(j, d) has different values, where d=1, . . . n, thereby further increasing matching availability.

6. The method of claim 1, wherein simple iterative matching comprising said request step, grant step and accept step is iteratively performed several times in each cell period, thereby further increasing matching efficiency.

* * * * *